United States Patent
Ponikwar et al.

(10) Patent No.: US 10,176,421 B2
(45) Date of Patent: Jan. 8, 2019

(54) METHOD FOR PRODUCING A DATA CARRIER THAT PREVENTS MECHANICAL STRAINS BETWEEN CHIP AND DATA CARRIER BODY

(71) Applicant: GIESECKE & DEVRIENT GMBH, Munich (DE)

(72) Inventors: Walter Ponikwar, Burghausen (DE); Thomas Tarantino, Laufen (DE); Tobias Salzer, Unterhaching (DE); Andreas Braun, Munich (DE); Gunter Endres, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 14/374,073

(22) PCT Filed: Jan. 16, 2013

(86) PCT No.: PCT/EP2013/000135
§ 371 (c)(1),
(2) Date: Jul. 23, 2014

(87) PCT Pub. No.: WO2013/110444
PCT Pub. Date: Aug. 1, 2013

(65) Prior Publication Data
US 2015/0014418 A1 Jan. 15, 2015

(30) Foreign Application Priority Data
Jan. 24, 2012 (DE) .......................... 10 2012 001 346

(51) Int. Cl.
*G06K 19/077* (2006.01)

(52) U.S. Cl.
CPC . *G06K 19/07728* (2013.01); *G06K 19/07722* (2013.01); *G06K 19/07749* (2013.01); *Y10T 29/49018* (2015.01)

(58) Field of Classification Search
CPC . H01L 2224/32225; H01L 2224/48091; H01L 2924/00; H01L 2924/1517;
(Continued)

(56) References Cited

U.S. PATENT DOCUMENTS

| 4,746,392 A | 5/1988 | Hoppe |
| 4,843,225 A | 6/1989 | Hoppe |

(Continued)

FOREIGN PATENT DOCUMENTS

| DE | 3248385 A1 | 6/1984 |
| DE | 4040770 A1 | 6/1992 |

(Continued)

OTHER PUBLICATIONS

International Search Report for corresponding International PCT Application No. PCT/EP2013/000135, dated May 14, 2013.

*Primary Examiner* — Steven S Paik
*Assistant Examiner* — Tae W Kim
(74) *Attorney, Agent, or Firm* — Workman Nydegger (57) ABSTRACT

This disclosure includes a method for manufacturing a portable data carrier, an inlay for a data carrier, and a data carrier. A data carrier body has a gap for a chip and a chip is incorporated into the gap. In a subsequent step a cover layer is laid on the data carrier body, and the data carrier body and the cover layer are laminated. After the incorporation of the chip and before the lamination, a stabilizing agent is applied into the gap of the core layer, which remains soft or flexible during the lamination and cures or is activated (e.g. by means of UV radiation) only after the lamination, in order for mechanical tensions to be avoided.

13 Claims, 7 Drawing Sheets

(58) Field of Classification Search
CPC . H01L 2224/48227; H01L 2924/00014; H01L 2224/16225; H01L 2224/24227; H01L 2224/49171; H01L 2224/73204; H01L 2224/83192
USPC .......................................................... 235/488
See application file for complete search history.

(56) References Cited

U.S. PATENT DOCUMENTS

| | | | | |
|---|---|---|---|---|
| 5,013,900 | A | * | 5/1991 | Hoppe .......................... 235/492 |
| 5,198,886 | A | * | 3/1993 | Verspeek et al. ............. 257/727 |
| 5,804,026 | A | | 9/1998 | Vogt |
| 6,305,609 | B1 | | 10/2001 | Melzer et al. |
| 8,314,343 | B2 | * | 11/2012 | Inoue ....................... H01L 24/24 |
| | | | | 174/255 |
| 2002/0037143 | A1 | * | 3/2002 | Kuhara et al. ................. 385/94 |
| 2003/0015342 | A1 | * | 1/2003 | Sakamoto et al. ............ 174/250 |
| 2003/0048154 | A1 | * | 3/2003 | Satoh et al. ................... 333/133 |
| 2005/0133698 | A1 | * | 6/2005 | Oniki et al. ................... 250/216 |
| 2009/0291271 | A1 | | 11/2009 | Michalk et al. |
| 2010/0226107 | A1 | | 9/2010 | Rietzler |
| 2011/0198028 | A1 | * | 8/2011 | Pedersen ................ C09J 161/28 |
| | | | | 156/310 |
| 2012/0201994 | A1 | * | 8/2012 | Michalk ........... G06K 19/07718 |
| | | | | 428/68 |
| 2013/0099003 | A1 | | 4/2013 | Tarantino et al. |

FOREIGN PATENT DOCUMENTS

| | | | |
|---|---|---|---|
| DE | 19504194 C1 | 4/1996 | |
| DE | 19602821 C1 | 6/1997 | |
| DE | 19942932 A1 | 3/2001 | |
| DE | 102009050753 A1 | 4/2011 | |
| DE | 102010025774 A1 | 1/2012 | |
| JP | 2005175020 A * | 6/2005 | ............ H01L 21/60 |
| WO | 2009135823 A1 | 11/2009 | |
| WO | 2011039327 A2 | 4/2011 | |

* cited by examiner

METHOD FOR PRODUCING A DATA CARRIER THAT PREVENTS MECHANICAL STRAINS BETWEEN CHIP AND DATA CARRIER BODY

BACKGROUND

The invention relates to a method for manufacturing a data carrier, an inlay for a data carrier, as well as to a data carrier itself. The invention relates in particular to a method for manufacturing a contactlessly readable data carrier with integrated IC, which can be used as a chip card, identification document, identity card or as a data page in a passport booklet.

A portable data carrier is basically a computer with a reduced overall size and resource range, which has a microcontroller and at least one interface for communication with an external device. It frequently possesses no, or only a rudimentary, dedicated user data output. Its outer construction form is so designed that it can be easily carried by a user at any time. Preferably, a data carrier is equipped with corresponding security functionalities, for example in the form of a smart card, chip card, mass memory card, multimedia card. For example a payment card, such as credit or debit cards, is a data carrier as it is described herein. Alternatively, it is an electronic identity document, such as for example an electronic national identity card, a passport, having machine-readable identification data of a person stored on a chip.

Portable data carriers now increasingly have a contactless interface. The operating system of the chip card is here so designed that the contactless interface can exchange data for example according to one of the protocols described in the standards ISO/IEC 14443, 15693 or 18092. Additionally, a contact-type interface, for example according to ISO/IEC 7816, can further be operated parallel. For this purpose, the data carriers are provided with transponder arrangements consisting of a chip and a near-field communication antenna connected therewith. For the sake of simplicity, in the following there will be employed the term coil instead of near-field communication antenna. These chip-coils arrangements allow to contactlessly read data stored in the IC and/or to contactlessly write data thereto. The manufacturing of such data carriers is typically effected by laminating at least one core layer and two cover layers, the chip-coil arrangement being integrated into the core layer. Such constructions are also referred to as inlays.

A problem with respect to the durability of such data carriers is the bond between the chip and the data carrier body. The two consist of different materials, the chip is hard and high-melting, while the material employed for the data carrier body is comparatively soft and readily laminatable. The different material constitutions of chip and data carrier body lead upon long-term use sometimes to the formation of cracks emanating from the border region between chip and data carrier body and continuing in the bordering layers.

A cause for the formation of cracks can be found in the mechanical load on the data carriers, by means of which the mechanical tensions frozen in the data carrier body are released. The mechanical tensions could have been introduced into the data carrier body, for example, during the lamination. In particular, a formation of cracks or, likewise, a breaking of a layer of the data carrier body, for example of a foil layer occurs. These cracks may propagate into the nearest foil layer. In particular the electrical functionality, the appearance, the ruggedness against external environmental influences and also the mechanical stability of the data carrier are impaired by the cracks. In extreme cases, the electrical functionality of the data carrier, in particular the contactless reading of/bringing data from/into the IC of the data carrier is no longer possible.

From the G&D print DE 4040770 A1 it is known to cover a carrier band having chips with a thermoplastic layer. Upon placing the chips into the card body the adhesive is activated by means of pressure/heat and ensures a stress-free bond of chip and card body.

From the WO 2009/135823 A1 there can be inferred a construction for a multilayer body of a data carrier body in which individual layers contain inserts made of a softer plastic material. A chip to be integrated into the data carrier body is arranged exactly in such a patch made of softer plastic material. The extension of the patch here is larger than the chip. During the lamination this plastic material softens and is arranged around the module thereby. In this way, stress zones leading to cracks can be prevented. The realization of the patchwork-like layers is elaborate, however, and, moreover, the plastic material is difficult to position.

In the DE 10 2010 025 774 A1, before the chip module is inserted into the card layer construction, a chip is wetted with an adhesive agent and placed into the card body. Thus, components adverse to lamination are made connectable during the lamination, without the occurrence of microcracks being possible. The chip module is treated before it is placed into the card body, so that a good adhesive connection between chip module and data carrier body can be obtained.

In the DE 10 2009 050 753 A1 there is described a manufacturing method for data carriers, in which a chip module is arranged on a carrier substrate. A liquid UV adhesive is employed for configuring an intermediate layer by means of appropriate shaping. Then, a cover layer is laid on. Then, the UV adhesive is cured by means of UV radiation, the data carrier singled and then laminated.

In the book, "Vom Plastik zur Chipkarte" by Y. Haghiri, T. Tarantino, Carl Hanser Verlag, Munich, 1999, there are described manufacturing methods for chip cards, in particular the lamination technique.

The problem in all of these propositions is that the mechanical tensions between chip, electronic components and data carrier body, which were introduced during the lamination, cannot be sufficiently compensated, because adhesive and chip form a mechanical unit already before the lamination. This leads to mechanical tensions in the data carrier during the lamination. Upon proper use of the data carrier, these tensions lead to the described formation of cracks.

SUMMARY

The invention is therefore based on the object of stating a method which allows crack-resistant data carriers to be manufactured without substantial interventions in the lamination process. There are to be avoided in particular mechanical tensions which arise in the data carrier body during a lamination process and may lead to the formation of cracks in everyday use. Nevertheless, the chip is to be incorporated in mechanically stable manner in the data carrier body. At the same time the manufacturing method should not be substantially more complex or more cost-intensive, the aim being in particular a mass production of the data carrier.

The object of the invention is achieved by the measures described in the equal-ranking independent claims. Advantageous embodiments are described in the respective dependent claims.

In particular a method for manufacturing a data carrier is proposed. For this purpose, a data carrier body having a gap for a chip is made available. Into the gap there is incorporated a chip. Then, a cover layer is laid on the data carrier body. The resulting layer sequence is now laminated. The method of the invention is characterized in that after the incorporation of the chip and before the lamination there is applied a stabilizing agent into the gap of the core layer.

The stabilizing agent according to the invention has the effect that during the lamination process the chip is flexibly integrated in the data carrier body. In particular, the stabilizing agent is not activated before the lamination, before the lamination step there exists neither a firm connection between chip and the side walls of the gap nor between chip and the cover layer. Thus, the stabilizing agent can flexibly spread over chip and contact points for the coil contacts before and during the lamination process. In a preferred configuration the stabilizing agent sheathes the chip. During the lamination the chip remains flexible in the data carrier body, so that upon the connection of the individual layer sequences by lamination no mechanical tensions between chip, coil and/or data carrier body can arise which remain frozen in the data carrier body.

At the end of the lamination process or preferably after the completion of the lamination process the stabilizing agent is activated. By the activation the stabilizing agent is brought from its flexible material state into an elastic material state. For this reason, the stabilizing agent is flexible before and during the lamination. After the lamination there exists a sufficient adhesive connection between data carrier body and chip without there being present any mechanical tensions in this connection.

In a configuration, the stabilizing agent can previously cross-link with the surfaces of chip and data carrier body under the condition that the stabilizing agent remains elastic after the lamination. In particular, the stabilizing agent compresses around the chip and/or flows around the chip.

According to the invention, a chip is an integrated semiconductor chip which is sheathed by means of a potting material. The term chip comprises, on the one hand, a separate chip module having its own carrier and, where applicable, contact areas on an upper side of the carrier, so that the chip can also be operated in a contact-type manner. On the other hand, the chip is incorporated into the data carrier body according to the flip-chip technology, the chip in particular having contact terminals for the coil.

In particular, the stabilizing agent is applied above the chip. Through the covering of the resulting data carrier body with a cover layer the stabilizing agent already spreads in the gap and thus also fills edge regions between gap and chip. The result is a good sheathing of the chip with the stabilizing agent. The stabilizing agent is, for example, arranged in point form on the chip and/or arranged around the chip in the gap. During the lamination the stabilizing agent is compressed around the chip.

The stabilizing agent has in particular a viscosity which enables it to be applied around the chip. The viscosity is in this case a parameter that is accordingly adjustable by the processing step.

In an alternative configuration, the stabilizing agent is activated after the lamination process. The stabilizing agent is activated preferably by radiation.

In a preferred configuration, ultraviolet, UV for short, radiation is employed for activating the stabilizing agent. In this case, the stabilizing agent is a UV-curing potting material, a UV-post-cross-linkable hot-melt potting material and/ or a UV contact adhesive. Through a stabilizing agent on UV-basis a simple application of the stabilizing agent onto the chip is given and the stabilizing agent remains flexible during the lamination. Furthermore, stabilizing agents on UV-basis react very fast, so that activating the stabilizing agent is completed in a short time-span.

In an alternative configuration, the stabilizing agent is a water-based lacquer or contact adhesive. These are preferably set to be soft or flexible and dry in a conventional manner. This means that such stabilizing agents are activatable in particular at room temperature, under low heat supply and/or completely without heat supply. This allows such stabilizing agents to remain flexible during the lamination process and, moreover, to be readily applied onto the chip. An additional technical effort, in particular elaborate or complex application apparatuses are therefore not necessary.

In an alternative configuration, the stabilizing agent is a solvent-based lacquer or contact adhesive. These are preferably set to be soft or flexible and also dry in a conventional manner like the water-based stabilizing agents. This allows such stabilizing agents to be flexible during the lamination process and, moreover, to be readily applied onto the chip. An additional technical effort, in particular elaborate or complex application apparatuses are therefore not necessary.

In an alternative configuration, the stabilizing agent is a one- or multi-component system. Here, one component can be arranged on the cover layer in exact register above the incorporated chip and a second component can be applied directly onto the chip. Upon the contacting of the two components the two components mix, thereby starting the contact-adhesive function. As the lamination process is completed before the multi-component system has completely cured, no mechanical tensions are created through the lamination.

In an alternative configuration, the stabilizing agent is a so-called hot-melt agent, which is of a solid material state at room temperature and becomes processable through thermal radiation. The lamination process is carried out before the cooling, so that this type of stabilizing agent remains flexible during the lamination and mechanical tensions cannot arise. Directly after the cooling and solidification of the hot-melt agent a firm connection is present. Further advantage is that such stabilizing agents are solvent-free and do not outgas upon activation.

In a preferred configuration, the data carrier body is constructed at least of a carrier layer and a core layer.

The core layer has a gap into which the chip is incorporated. The core layer is also referred to as a spacer layer. In particular, the core layer is minimally higher than the chip on the carrier layer, so that the stabilizing agent can be contacted with the cover layer above the chip.

The carrier layer is preferably equipped with a near-field coil. This coil or also antenna is either printed directly on the carrier layer or arranged in the form of wire windings above the carrier layer and is embedded between carrier layer and core layer upon lamination. Upon incorporation onto the carrier layer the chip is electroconductively connected with the near-field antenna. In particular this connection is not subjected to mechanical tensions upon lamination.

The chip is fixed, where applicable, by means of an adhesive agent. The contact adhesive is metered on the carrier layer before the chip is laid on. This fixes the chip in the data carrier body, so that further processing steps, in particular laying on the cover layer and lamination can be carried out without the electrical connection to the near-field antenna being destroyed.

In an alternative configuration, the stabilizing agent is arranged on the cover layer and is applied in exact register in the gap while the cover layer is being laid on the core layer. This enables a simplified roll-to-roll manufacturing method and accelerates the manufacturing process.

In a preferred configuration, the stabilizing agent is applied by means of a metering unit. This metering unit includes the flexible stabilizing agent in order to be able to apply it onto the chip. Such metering units can apply the stabilizing agent within a short time, so that these are suitable for a fast mass production with locally exact and quantitatively exact application. In an alternative configuration, the stabilizing agent is applied by printing technology. In particular a screen printing method is to be employed, which leads to a locally accurate and fast application.

In a configuration, data carrier body and cover layer form the finished data carrier having a standardized thickness as well as, where applicable, a design print and an optical personalization of the data carrier.

In a development of the invention, the carrier layer, the core layer and the cover layer form an inlay for a data carrier, in particular an inlay for an identification document with contactless data transmission. On this inlay there are laid further overlay layers on both sides, thereby being realized a standardized thickness of the data carrier as well as a design print and an optical personalization of the data carrier.

In the basic idea of the invention there is further a data carrier body consisting of a carrier layer, a core layer and at least one cover layer, wherein the core layer has a gap in which there is arranged a chip; carrier layer, core layer and cover layer are interconnected by lamination and within the gap there is arranged a stabilizing agent which covers the chip on the upper side before the lamination.

BRIEF DESCRIPTION OF THE DRAWINGS

Hereinafter the invention or further embodiments and advantages of the invention will be explained more closely on the basis of Figures, the Figures merely describing embodiment examples of the invention. Identical components in the Figures are provided with identical reference signs. The Figures are not to be considered true to scale, individual elements of the Figures may be represented with exaggerated size or exaggerated simplicity.

There are shown.

DETAILED DESCRIPTION OF VARIOUS EMBODIMENTS

Figure 1:
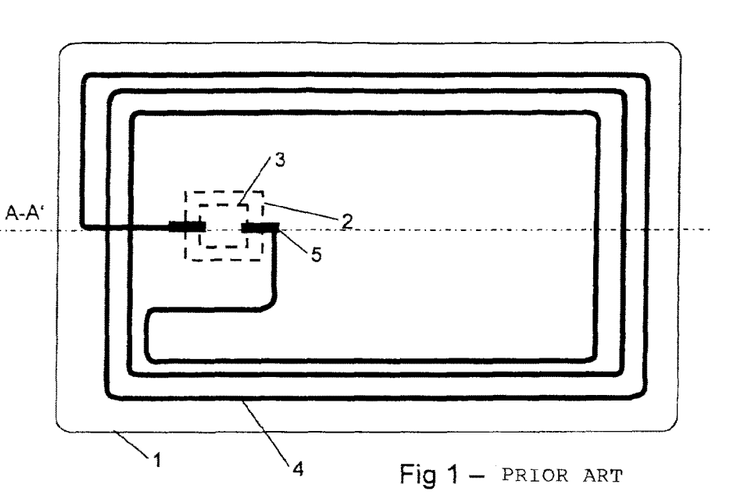
FIG. 1 a data carrier in plan view with incorporated near-field antenna according to the prior art FIG. 2 the data carrier according to FIG. 1 in cross section according to the sectional line A-A'

FIG. 1 shows a data carrier 1 in plan view with an incorporated near-field antenna according to the today's prior art. A gap 2 is incorporated in the data carrier body 6. This gap 2 can be manufactured in different ways, for example by constructing the data carrier body 6 in layers with a corresponding gap 2 in one of the layers. Into the gap 2 there is incorporated a chip 3. The chip 3 either is an integrated semiconductor chip arranged with contact pads on a substrate, which semiconductor chip is incorporated into the data carrier body 6 such that a contacting of the chip by means of an external end device is possible. Alternatively, the chip is a molded semiconductor chip, which is incorporated into the gap 2 to be electroconductively connected with contacting points 5 of the data carrier body 6 there. The contacting points 5 in turn are connected with a near-field antenna 4, in the following referred to as coil 4, arranged in the data carrier body 6.

Such data carriers are versatilely used and employed in particular for a contactless reading and bringing in of data from/on a semiconductor chip. In particular, such constructions are employed for credit or debit cards, as well as electronic identity documents such as electronic passport and electronic national identity card.

Figure 2:
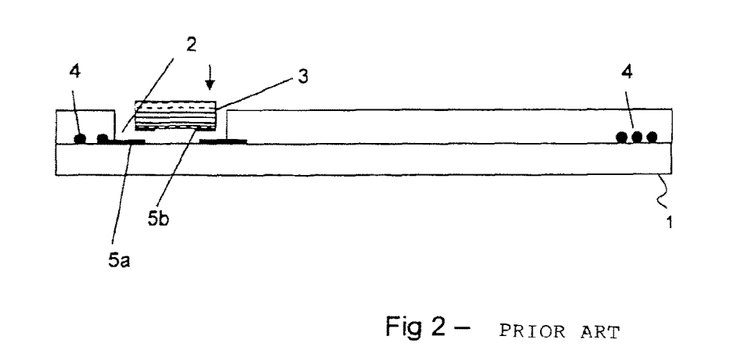

FIG. 2 sketches a cross section of a data carrier 1, shown according to a sectional line A-A' of the FIG. 1. It can be recognized that the data carrier body 6 is constructed of a layer sequence. The coil 4 is laid on a carrier layer 61 of the data carrier body 6. The data carrier body 6 has coil connecting contacts 5a in the edge region of its gap 2. These coil connecting contacts 5a are electroconductively connected with respective coil connecting contacts 5b of the chip 3, when the chip 3 is incorporated into the gap 2. For establishing an electrical conductivity between chip 3 and the terminals 5a versatile possibilities are known, in particular solder bumps, conductive paste, conductive plastic substrate and the like. The chip 3 is connected with the data carrier body 6 by means of a chip adhesive 7.

Figure 3A:
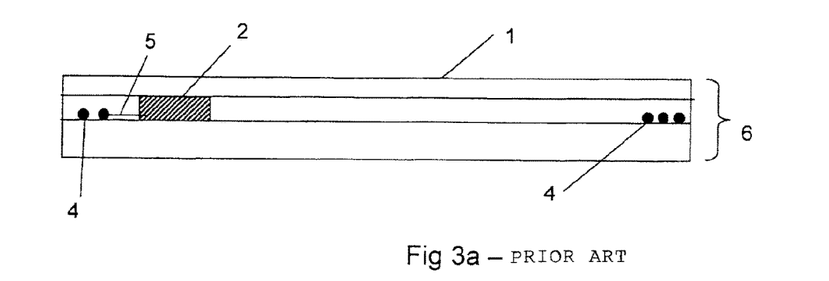
FIG. 3a-b a mechanical load on a data carrier with arising microcracks
Figure 3B:
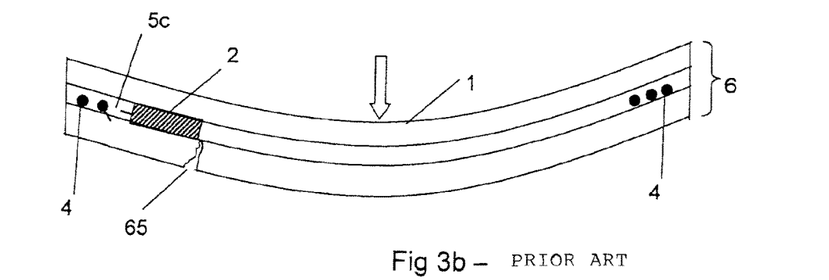

In the FIG. 3 it is represented how a data carrier 1 of the FIGS. 1 and 2 can lose its electrical functionality through breakage 5c of the electrical connection due to mechanical load through bending and/or how microcracks 65 in the data carrier body 6 can lead to mechanical instability or to a lack of protection from external environmental influences. This formation of cracks must therefore be avoided by all means.

The data carrier 1 of the FIGS. 3a-b is not equipped with a stabilizing agent 8 according to the invention. The chip 3 is placed on a core layer 62 by means of a chip adhesive 7. Above and below the core layer 62 there is applied a cover layer 63. The obtained layer sequence is interconnected by means of a laminating apparatus. In the data carrier according to the FIGS. 3a-b, the embedded chip 3 is inflexibly connected with the data carrier body 6 already before the lamination. Upon lamination, the layer sequence is put between two hot laminating plates. The laminating plates reduce their distance, thereby the individual foil layers becoming soft and being interconnected. Since the chip is incorporated as an inflexible element in the card body 6, mechanical tensions are created in the data carrier body 6 through the softening of the foil layers. Upon cooling of the data carrier these mechanical tensions in the data carrier body 6 are retained or may even be increased. Colloquially, one speaks of freezing the mechanical tensions. If due to the everyday's loads on the data carrier 1 it comes to relative bending motions of the data carrier body 6, the mechanical tensions are further increased until the acting forces are too great for the data carrier body 6. As a result, it comes to a breakage 5c of one of the electrical connections between coil 4 and chip 3, as shown in FIG. 3b. Then the chip 3 in the data carrier 1 can no longer be read.

An alternative result of such tensions can be that a foil layer suffers a microcrack 65 due to the low thickness, as represented in FIG. 3b. These microcracks may even continue in neighboring foils. These microcracks 65 decrease the mechanical stability of the data carrier 1. Additionally, through these microcracks 65 the data carrier 1 loses its resistance to environmental influences, such as moisture, soil and also chemicals. Such microcracks may occur as local hair cracks or also as a split of complete foil layers and must be avoided.

In FIGS. 4 to 8 there are thus represented data carriers 1 with reference to alternative manufacturing steps, in which a stabilizing agent 8 according to the invention is incorporated. The construction of the data carriers 1 is effected primarily in layers 61 to 64, the individual layers 61 to 64 being manufactured of foil material, in particular PC. This method is primarily provided for mass production, so that the foil layers 61 to 64 either are made available and processed as endless material in the roll-to-roll method or are made available in the form of foil sheets, from which the individual data carriers 1 are respectively singled after the lamination.

At first, the manufacturing method according to FIGS. 4a-e is described. According to FIG. 4a, a carrier layer 61 is made available. This carrier layer 61 already has a coil 4, which either was printed on in the form of a coil print, was laid on according to a vapor deposition process or was laid on as a wire winding above the carrier layer 61. Above the carrier layer 61 on the side of the coil 4 there is arranged a core layer 62. This core layer 62 is also referred to as spacer layer or spacer foil 62. The core layer 62 has a gap 2. In the simplest case, the gap 2 is a window in the foil 62. In accordance with FIG. 4c, now a chip 3 is incorporated into the gap 2. For this purpose, there is already employed, where applicable, a chip adhesive 7 so that the chip can be fixed in the construction. By incorporating the chip 3 into the gap 2 an electroconductive connection 5 to the coil 4 is established. According to the invention, there is now applied a stabilizing agent 8 above the chip 3. The application is effected by means of a metering unit (not shown) or, alternatively, in a screen printing step. The core foil 62 has a higher thickness than the chip 3, so that both chip adhesive 7 and stabilizing agent 8 can be incorporated into the gap 2. The stabilizing agent 8 has such a viscosity that the chip 3 is wetted with the stabilizing agent also at the side areas. In particular, the stabilizing agent is flexible and does not cure before the lamination.

Figure 4A:
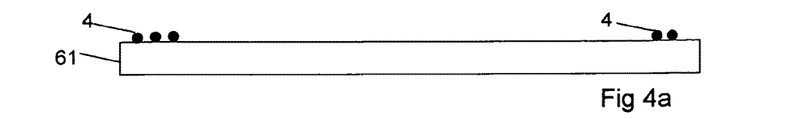
FIG. 4a-e a data carrier according to the invention in the individual manufacturing steps FIG. 5a-e a data carrier according to the invention in manufacturing steps alternative to FIG. 4
Figure 4B:
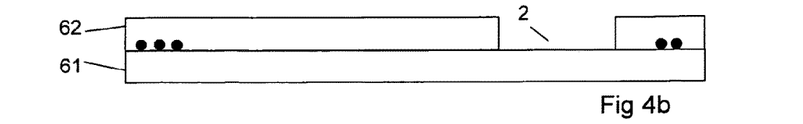
Figure 4C:
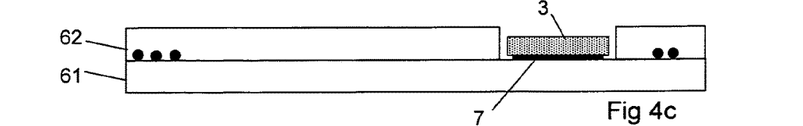
Figure 4D:
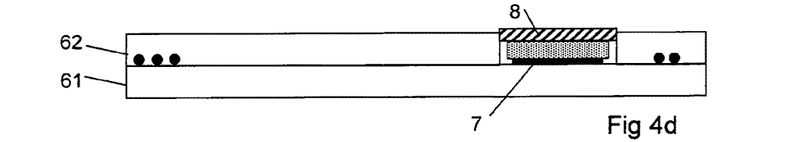
Figure 4E:
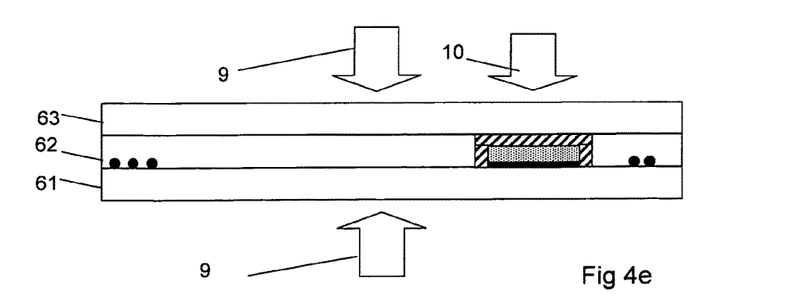

In accordance with FIG. 4e, now a cover layer 63 is arranged on the core layer 62 and the obtained layer construction 61 to 63 is laminated, which is represented by the arrows 9. Only in a subsequent step the stabilizing agent is activated, which is represented by the arrow 10. By the constitution of the stabilizing agent 8 it is achieved that the chip is sheathed. Mechanical stress built up during the lamination 9 is absorbed by the stabilizing agent 8, so that no tensions are frozen in the data carrier body 6, in particular in the individual foil layers 61, 62, 63, so that the data carrier body 6 has no mechanical tensions after the lamination.

Alternatively to step 10, the stabilizing agent 8 cross-links upon incorporation into the gap 2 with the chip and the layers 61, 62 and 63. For this purpose, the stabilizing agent 8 is applied in point form above the chip 3 and distributed in the gap 2 by laying on the cover layer 63. Through the lamination the stabilizing agent 8 is further compressed in the gap. The stabilizing agent 8 remains elastic also after the lamination 10 and compensates the mechanical tensions occurring during the lamination 10.

Figure 5A:
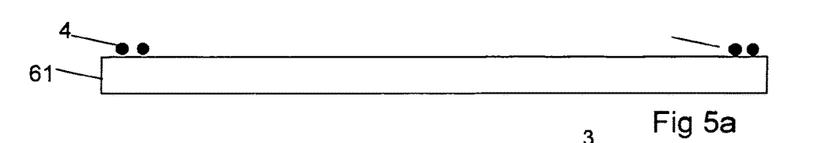
Figure 5B:
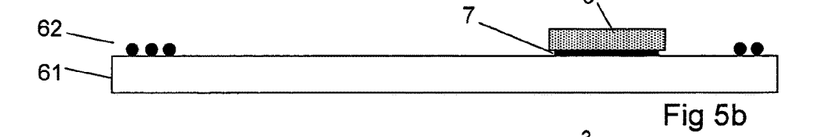
Figure 5C:
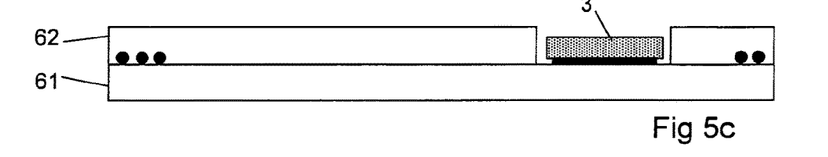
Figure 5D:
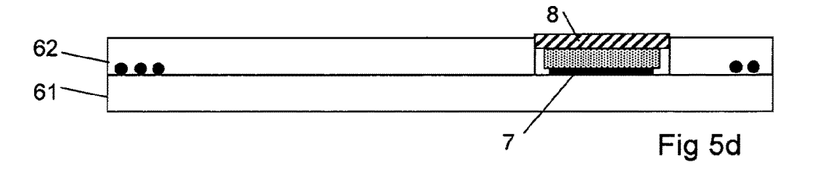
Figure 5E:
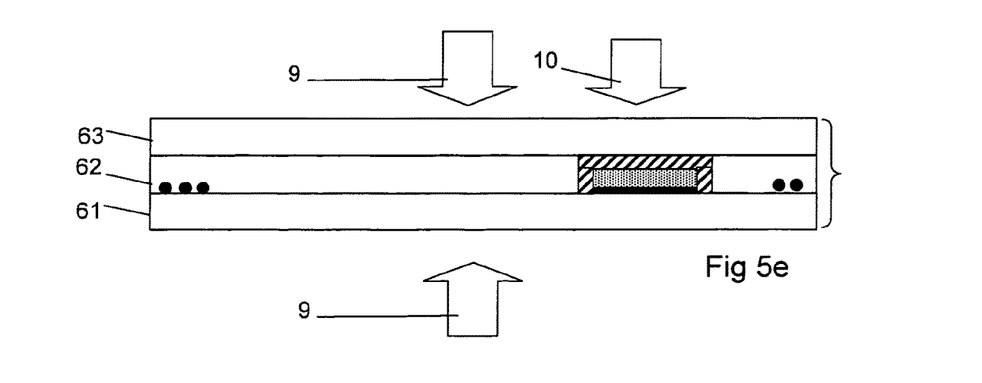
Figure 6A:
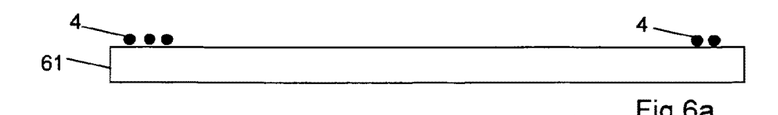
FIG. 6a-e a data carrier according to the invention in manufacturing steps alternative to FIGS. 4 and 5
Figure 6B:
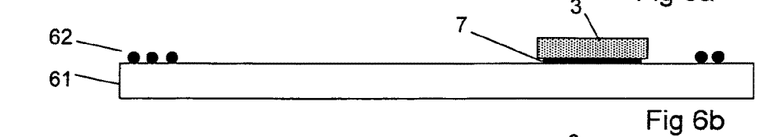
Figure 6C:
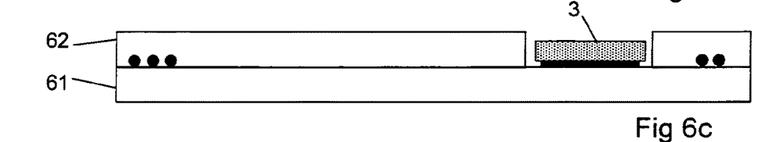
Figure 6D:
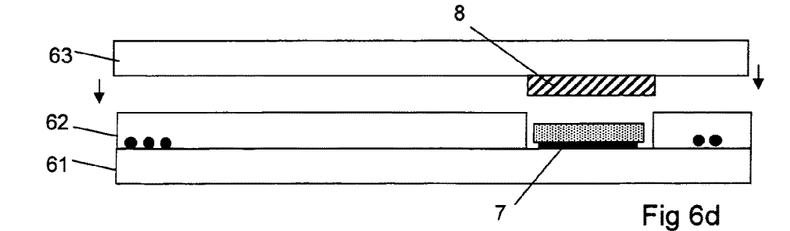
Figure 6E:
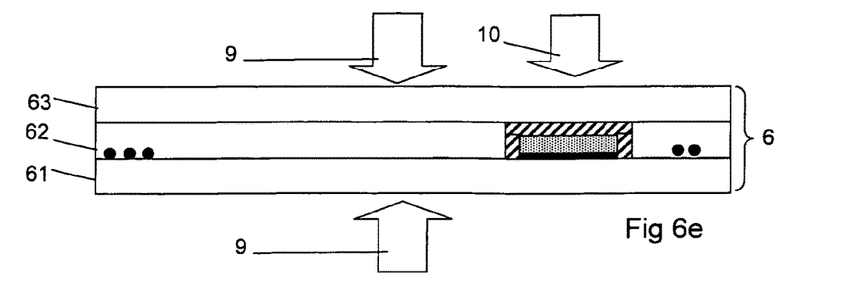

In FIGS. 5a to 5e there is represented a modified manufacturing method, here only the substantial differences being dealt with. In contrast to FIG. 4b, in FIG. 5b first the chip is arranged on the carrier layer 61 and electrically contacted with the coil 4. Then the core foil 62 with the gap 2 is arranged on the carrier layer 61, the chip 3 being incorporated into the gap 2. In the simplest case, the gap 2 is a window in the foil 62. The following steps according to FIGS. 5d and 5e are identical with the steps of FIGS. 4d and 4e.

In FIGS. 6a to 6e there is represented a modified manufacturing method, here only the substantial differences regarding FIGS. 4 and 5 being dealt with. In contrast to FIG. 4d, in FIG. 6d the stabilizing agent 8 is not applied onto the chip 3, but the stabilizing agent 8 has already been applied on the back side on the cover layer 63.

By bringing together carrier layer 61 and cover layer 63 the stabilizing agent 8 is incorporated into the data carrier body 6. The bringing together can be effected in exact register. FIG. 6e then again corresponds to FIG. 4e. This method can also be combined with the method of FIG. 4 or 5, thereby enabling the use of multi-component stabilizing agents 8. A first component is then applied directly on the chip 3, a second component on the back side on the cover layer 63, by bringing one on the other the two components being mixed and accordingly reacting with each other.

Figure 7:
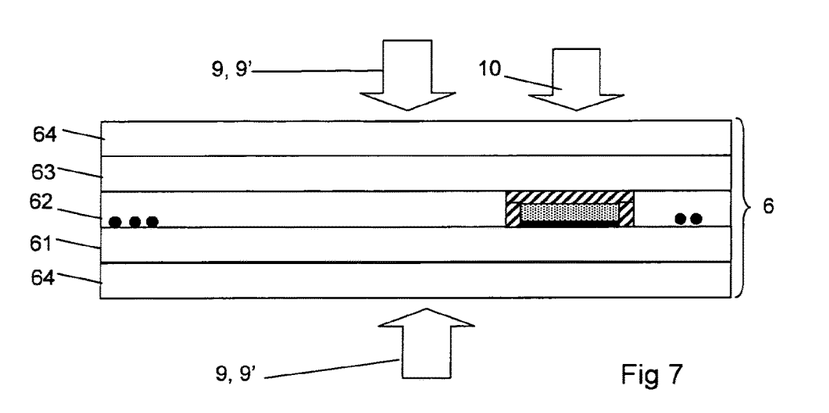
FIG. 7 a data carrier alternative to FIGS. 4 to 6

In FIG. 7 there is shown a development of the FIGS. 4 to 6, which indicates that the layer sequence of carrier layer 61, core layer 62 and cover layer 63 can be provided as an inlay for a data carrier 1 and further overlay layers 64 can be laid on both sides on the inlay. The inlay can already be laminated and the overlay layers 64 will be laid on in a further lamination process 9'. Alternatively, the resulting foil construction according to layers 64, 61, 62, 63, 64 is laminated in one pass, no separate inlay being produced. After the first and, where applicable, second lamination process 9, 9' the stabilizing agent 8 is activated. Alternatively, the stabilizing agent 8 is activated previously, whereby in particular an elastic material state of the stabilizing agent 8 must be retained during and after the lamination 9. The overlay foils 64 serve for the design print and, where applicable, for an optical personalization of the data carrier 1.

Figure 8A:
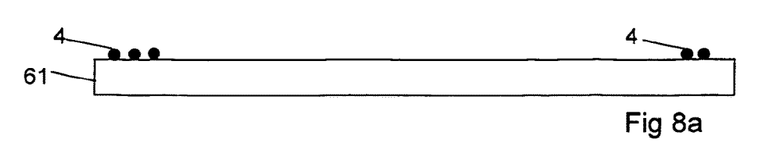
FIG. 8a-d a data carrier according to the invention, alternative to FIG. 4, in the individual manufacturing steps
Figure 8B:
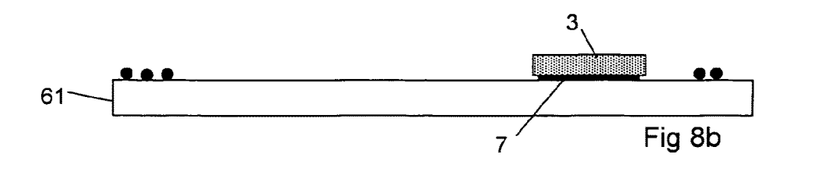

According to FIG. 8a, a carrier layer 61 is made available. This carrier layer 61 already has a coil 4, which either was printed on in the form of a coil print, was laid on according to a vapor deposition process or was laid on as a wire winding above the carrier layer 61. Above the carrier layer 61 on the side of the coil 4 there is mounted a chip 3 according to FIG. 8b. For this purpose, there is already employed, where applicable, a chip adhesive 7 so that the chip can be fixed in the construction. By the incorporation of the chip 3 there is established an electroconductive connection 5 to the coil 4.

Figure 8C:
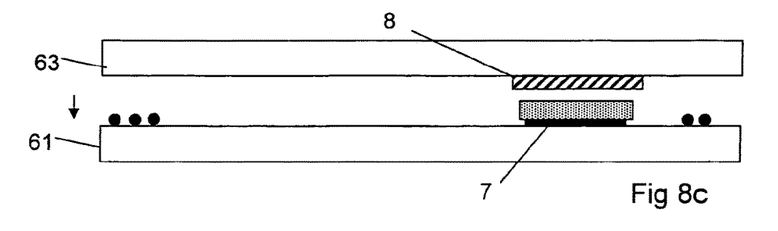

According to FIG. 8c, there is now arranged a cover layer 63 on the carrier layer 61. The layers 61 and 63 are heated to a softening point before the lamination 9, when PC is used as a material of the layers 61, 63 to approx. 150 degrees Celsius. Then the obtained layer construction 61 and 63 is laminated, which is represented by the arrows 9.

According to the invention, with the arrangement of the cover layer 63 a stabilizing agent 8 is applied above the chip 3. Additionally, there can also be applied a stabilizing agent 8 below the chip 3. The application is effected by means of a metering unit (not shown) or, alternatively and preferably, in a screen printing step. The stabilizing agent 8 has such a viscosity that the chip 3 is wetted with the stabilizing agent 8 also at the side areas. In particular, the stabilizing agent 8 is flexible and does not cure before the lamination 9.

Figure 8D:
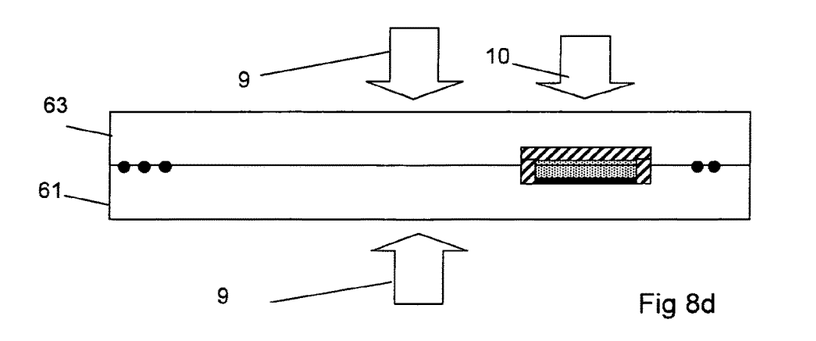

Only in a subsequent step the stabilizing agent is activated, which is represented by the arrow 10. By the constitution of the stabilizing agent 8 it is achieved that the chip 3 is sheathed. Mechanical stress built up during the lamination 9 is absorbed by the stabilizing agent 8, so that no tensions are frozen in the data carrier body 6, in particular in the individual foil layers 61, 63, so that the data carrier body 6 has no mechanical tensions after the lamination.

Alternatively to step 10, the stabilizing agent 8 cross-links upon incorporation into the gap 2 with the chip and the layers 61 and 63. The stabilizing agent 8 remains elastic also after the lamination 10 and compensates the mechanical tensions occurring during the lamination 9.

The stabilizing agent 8 of the invention in all the Figures is a material which is flexible and does not cure already during the lamination process, thereby being enabled to absorb the arising mechanical stress and the chip having the coil cannot be put under mechanical stress. The stabilizing agent 8 spreads uniformly around the chip 3 and in the interstices between gap 2 and chip 3 during the lamination.

As stabilizing agents there can be employed lacquers or dispersion contact adhesives which are water-based. These can dry conventionally. They can be set to be soft and can thus be readily applied in the gap 2. Alternatively, these lacquers or dispersion contact adhesives are based on a solvent. The activatability of this substance is given in the belated curing. As soon as the agent 8 is applied, the foil compound is laminated. The lacquers or contact adhesives are constituted such that a curing is only effected after the lamination.

Alternatively, as a stabilizing agent 8 there is employed an agent which is activatable by means of radiation. For example a hot-melt liquefied by means of thermal radiation is incorporated into the gap 2 shortly before the lamination. The lamination prevents a curing of the hot-melt, thereby enabling the hot-melt to absorb arising mechanical tensions. After removal of the laminating plates the layer sequence cools down, thereby solidifying also the hot-melt which ensures mechanical stability. The hot-melt, also referred to as adhesive melt, can be a potting material or a contact adhesive.

Alternatively, as a stabilizing agent 8 there is employed an agent which is activatable by means of UV radiation. For example a flexible UV-curing potting material or a UV-curing contact adhesive agent is incorporated as a stabilizing agent 8 and remains in this flexible state during the lamination. After the lamination the UV-activatable agent is set hard by means of a UV-radiation generator.

The application of the stabilizing agent 8 is effected via a metering unit or in a screen printing method here.

LIST OF REFERENCE NUMBERS

1 Portable data carrier, contactless chip card
2 Gap
3 Chip
4 Near-field antenna, coil
5 Electrical connection between coil and chip
　5a Coil connecting contact in carrier layer
　5b Coil connecting contact on chip
　5c Breakage of the electrical connection
6 Data carrier body
　61 Carrier layer
　62 Core layer
　63 Cover layer
　64 Overlay layer
　65 Microcrack
7 Chip adhesive
8 Stabilizing agent
9 Laminating plates
10 Activation of the stabilizing agent
A-A' Sectional line through the data carrier

The invention claimed is:

1. A method for manufacturing a portable data carrier having the method steps of:
   making available a data carrier body, wherein the data carrier body includes at least a carrier layer and a core layer, the core layer defines a gap for receiving a chip, the chip having a first side provided with first electroconductive contact points;
   applying an adhesive to a first segment of the carrier layer exposed by the gap, said first segment being provided with second electroconductive contact points;
   incorporating a chip into the gap such that the first electroconductive contact points of the chip contact the second electroconductive contact points of the first segment of the carrier layer, the adhesive securing the chip to the carrier layer on the first side of the chip;
   applying a stabilizing agent into the gap of the core layer on a second side of the chip opposite the first side, wherein the stabilizing agent is applied by printing technology;
   laying a cover layer on the data carrier body;
   laminating the data carrier body and the cover layer, wherein during the lamination the stabilizing agent is compressed around the chip and the contact points, so that the chip remains free from direct rigid connection to the core layer and the cover layer;
   curing the stabilizing agent after the step of laminating the data carrier body and the cover layer; and
   wherein after the step of curing the stabilizing agent, the chip is only directly elastically connected to the core layer and the cover layer.

2. The method according to claim 1, wherein the stabilizing agent is applied above the chip into the gap.

3. The method according to claim 1, wherein the stabilizing agent is arranged on the cover layer and is applied into the gap while the cover layer is being laid on the core layer.

4. The method according to claim 1, wherein the stabilizing agent is only activated after the step of the lamination.

5. The method according to claim 1, wherein a coil was laid on the carrier layer and this coil is electroconductively connected with the chip upon the step of laying the chip on the carrier layer.

6. The method according to claim 1, wherein the carrier layer, the core layer and the cover layer form an inlay for a data carrier and further overlay layers are laid on.

7. A data carrier body consisting of a carrier layer, a core layer and at least one cover layer, wherein:
   the core layer defines a gap in which a chip is arranged, the chip having a first side provided with first electroconductive contact points and a first segment of the carrier layer exposed by the gap being provided with second electroconductive contacts,
   wherein the chip is arranged in the gap such that the first electroconductive contact points of the chip contact the second electroconductive contact points of the first segment of the carrier layer and an adhesive directly connects the chip and the carrier layer on the first side of the chip;

the carrier layer, core layer and cover layer are interconnected by lamination, wherein within the gap there is arranged a stabilizing agent which covers the chip on an upper side before the lamination and the stabilizing agent is flexible before and during the lamination and activatable after the lamination, so that the chip remains free from direct rigid connection to the core layer and the cover layer such that no mechanical tensions from the lamination are frozen in the stabilizing agent surrounding the chip;

wherein after the step of curing the stabilizing agent, the chip is only directly elastically connected to the core layer and the cover layer.

8. The data carrier body according to claim 7, wherein the stabilizing agent is activatable by a radiation.

9. The data carrier body according to claim 7, wherein the stabilizing agent is a water-based and/or solvent-based lacquer.

10. The data carrier body according to claim 7, wherein the stabilizing agent is a water-based and/or solvent-based contact adhesive.

11. The data carrier body according to claim 7, wherein the stabilizing agent is a multi-component system contact adhesive.

12. The data carrier body according to claim 7, wherein the stabilizing agent is a hot-melt agent adhesive.

13. A method for manufacturing a portable data carrier having the method steps of:

making available a data carrier body, wherein the data carrier body includes at least a carrier layer and a core layer, the core layer defines a gap for receiving a chip, the chip having a first side provided with first electroconductive contact points;

applying an adhesive to a first segment of the carrier layer exposed by the gap, said first segment being provided with second electroconductive contact points;

incorporating a chip into the gap such that the first electroconductive contact points of the chip contact the second electroconductive contact points of the first segment of the carrier layer, the adhesive being between the chip and the carrier layer;

arranging a stabilizing agent on the cover layer in exact register and applying the stabilizing agent in exact register only into the gap of the core layer while the cover layer is being laid directly on the core layer;

laying a cover layer on the data carrier body;

laminating the data carrier body and the cover layer, wherein during the lamination the stabilizing agent is compressed around the chip and the contact points, so that the chip remains flexible in the data carrier body; and curing the stabilizing agent after the step of laminating the data carrier body and the cover layer, wherein the stabilizing agent is a first component of a multi-component contact adhesive, and wherein a second component of the multi-component contact adhesive is applied on a second side of the chip opposite the first side such that the first and second components mix upon the step of laying the cover layer on the data carrier body.

* * * * *